US005526423A

United States Patent [19]
Ohuchi et al.

[11] Patent Number: 5,526,423
[45] Date of Patent: Jun. 11, 1996

[54] COMMUNICATION APPARATUS AND METHOD WITH SERVICE EXECUTION ACCORDING TO DIAL NUMBER

[75] Inventors: Masatomo Ohuchi; Hirokazu Ohi, both of Kawasaki, Japan

[73] Assignee: Canon Kabushiki Kaisha, Tokyo, Japan

[21] Appl. No.: 215,672

[22] Filed: Mar. 22, 1994

Related U.S. Application Data

[63] Continuation of Ser. No. 877,964, Apr. 30, 1992, abandoned.

[30] Foreign Application Priority Data

| May 8, 1991 | [JP] | Japan | 3-131944 |
| Jul. 1, 1991 | [JP] | Japan | 3-188098 |
| Jul. 10, 1991 | [JP] | Japan | 3-195914 |
| Jul. 18, 1991 | [JP] | Japan | 3-203435 |

[51] Int. Cl.⁶ .................................................. H04M 1/64
[52] U.S. Cl. .............................. 379/67; 379/95; 379/114; 379/355
[58] Field of Search ............................ 379/85, 201, 67, 379/355, 354, 216, 68, 156, 160, 88, 89, 111, 114, 106, 107, 91, 92, 95; 179/180, 200, 84, 67, 92

[56] References Cited

U.S. PATENT DOCUMENTS

| 4,410,765 | 10/1983 | Hestad et al. | 379/257 |
| 4,585,904 | 4/1986 | Mincone et al. | 379/131 |
| 4,602,129 | 7/1986 | Matthews | 179/188 |
| 4,833,704 | 5/1989 | Hashimoto | 379/85 |
| 4,866,763 | 9/1989 | Cooper et al. | 379/221 |
| 4,873,720 | 10/1989 | Son | 379/221 |
| 4,922,520 | 5/1990 | Bernard | 379/92 |
| 4,941,168 | 7/1990 | Kelly, Jr. | 379/92 |
| 4,942,598 | 7/1990 | Davis | 379/67 |
| 4,969,182 | 11/1990 | Ohtsubo | 379/67 |
| 4,991,203 | 2/1991 | Kakizawa | 379/209 |
| 4,998,272 | 3/1991 | Hawkins | 379/67 |
| 5,099,509 | 3/1992 | Morganstein | 379/84 |
| 5,187,710 | 2/1993 | Chau | 379/120 |
| 5,200,995 | 4/1993 | Gankel | 379/200 |
| 5,222,125 | 6/1993 | Creswell | 379/67 |

*Primary Examiner*—Jeffery Hofsass
*Assistant Examiner*—Fan Tsang
*Attorney, Agent, or Firm*—Fitzpatrick, Cella, Harper & Scinto

[57] ABSTRACT

In a telephone apparatus which accommodates a plurality of lines and a plurality of terminals, system services in accordance with preset working data are realized based upon prescribed operations such as the dialing of an outgoing call from a terminal. The system services include the storing of desired dial information, the recording and playback of voice information from an outside provider of voice information, and the supplying of billing information.

46 Claims, 21 Drawing Sheets

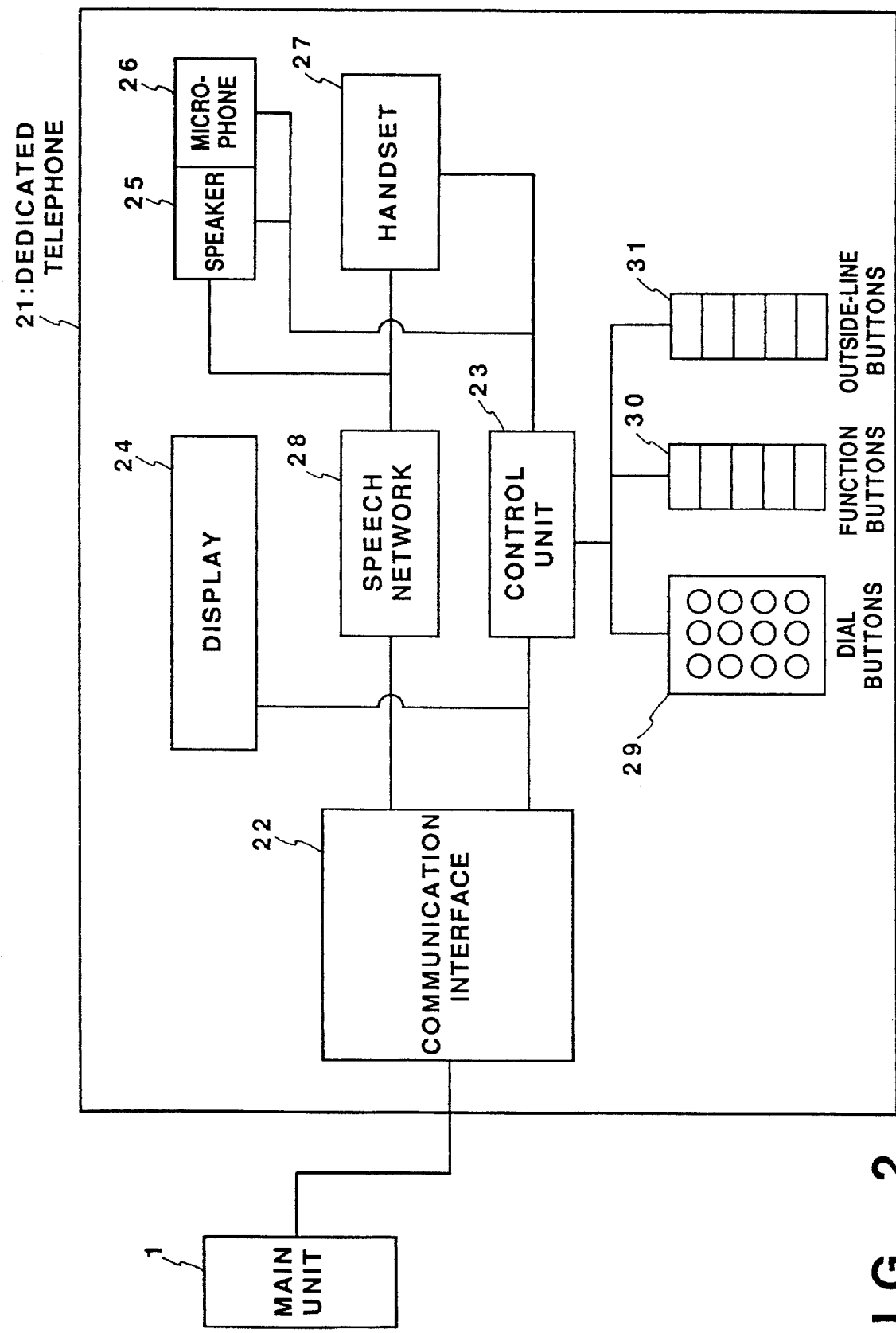
F I G. 2

FIG. 5

| NO. 41 | DIAL NO. OF OUTSIDE SERVICE 42 | ADDITIONAL SYSTEM SERVICE 43 | EXECUTABLE? 44 | (OTHER SETTING INFORMATION) 45 |
|---|---|---|---|---|
| 1 | 1 0 4 (NUMBER INFORMATION) | MEMO DIAL | YES | |
| | | CONVERSATION RECORDING | NO | |
| 2 | X X X X 1 1 9 2 (PRIVATE LOTTERY) | CONVERSATION RECORDING | NO | |
| | | | | |

| NO. | DIAL NO. OF OUTSIDE SERVICE | INFORMATION RELATING TO VOICE RECORDING UNIT ||| OTHER INFORMATION |
| --- | --- | --- | --- | --- | --- |
| | | OPERATING MODE | UPDATE TIMING | PREVIOUS DATE AND TIME OF UPDATING | RECORDING TIME | |
| 1 | 1 7 7<br>WEATHER FORECAST | 2 | EVERY 6 HRS | 91/03/18 10:00 | 2 MIN | |
| 2 | X X X X 1 1 9 2<br>LOTTERY | 1 | 1 WEEK | 91/03/01 15:00 | 3 MIN | |
| | | | | | | |

| NO. | DIAL NO. OF OUTSIDE SERVICE | ADDITIONAL SYSTEM SERVICE | COUNTER | UNIT CHARGE | OTHER INFORMATION |
|---|---|---|---|---|---|
| 1 | 104 NUMBER INFORMATION | MEMO DIAL | | 30 YEN | |
| | | | | | |
| | | | | | |

FIG. 12

| AREA NO. | AUTOMATIC OUTGOING-CALL DIAL NO. | AUTOMATIC OUTGOING-CALL TIME |
|---|---|---|
| 1 | 177 | 6 : 00 |
|   |     | 12 : 00 |
|   |     | 15 : 00 |
|   |     | 18 : 00 |
| 2 | 0990-xxxx | 12 : 00 |

F I G. 15

| AREA NO. | AUTOMATIC OUTGOING-CALL DIAL NO. | RECORDING-FAILURE COUNTER VALUE | RESULT OF RECORDING |
|---|---|---|---|
| 1 | 1 7 7 | 0 | SUCCESS |
| 2 | 0 9 9 0 - X X X X | 0 | SUCCESS |

F I G. 17

*** CALL PARTICULARS ***　　　　　　　　　　　　　　　　　　　　　　PAGE　　1
　　　　　　　　　　　　　　　　　　　　　　　　　　　　TOTALIZATION PERIOD　91/12/21-14:39

| DATE AND TIME | EXTENSION | OUTSIDE LINE | NUMBER | TIME | CHARGE |
|---|---|---|---|---|---|
| 91 12/14-09:44 | | | | | |
| 14-09:44 | 1 1(1) | 03 (0) | 75825## | 7 MIN. 20 SEC. | 30 YEN |
| 14-09:55 | 1 1(1) | 01 (0) | 61127## | 4 MIN. 30 SEC. | 20 YEN |
| 21-14:10 | 1 1(1) | 01 (0) | 61127## | 0 MIN. 20 SEC. | 10 YEN |
| 21-14:39 | 1 2(1) | 05 (0) | 104 | 3 MIN. 50 SEC. | XX YEN |

DATE AND TIME OF OUTGOING CALL

EXTENSION
OUTGOING TENANT NO.

OUTSIDE-LINE TERMINAL NO.
OUTGOING TENANT NO.

TELEPHONE NO. OF DESTINATION

CALL TIME　　CALL CHARGE

F I G.  19

COMMUNICATION APPARATUS AND METHOD WITH SERVICE EXECUTION ACCORDING TO DIAL NUMBER

This application is a continuation of application Ser. No. 07/877,964 filed Apr. 30, 1992, now abandoned.

BACKGROUND OF THE INVENTION

This invention relates to a telephone apparatus which provides a variety of system services using a voice recording and the like.

Various system services using a telephone are available in the art. For example, when a user inputs a dial number by entering a special number of pressing a special key during a telephone call, the number is stored in memory. Then, at the time of a subsequent outgoing call, the stored number is used as a dial number. This is a so-called "memo dial" service. Further the following services are available for starting a voice recording device by entering a special number of pressing a special key:

(1) "Audio Response": This is a service in which an incoming call is answered by a pre-recorded message. More specifically, necessary voice information (a message) is recorded in advance and is used to respond to an incoming call from another extension or outside line. The voice information from the programmer actuating the voice recording device (an audio response unit or the like) is recorded, or the voice information is recorded in a fixed manner. This is a function which allows an unspecified large number of individuals to hear the message.

(2) "Audio Message": This is a service in which a message is transmitted by voice. That is, the voice recording device is used as a voice message board. This is a function in which the individual actuating the voice recording device records audio message information and another party listens to the message information.

(3) "Conversation Recording/Playback": This is a service in which the audio of a telephone conversation is recorded and the recorded conversation is played back. According to this function, the voice information of the user and the other party in a telephone conversation is recorded and subsequently played back. More specifically, the voice information of the individual who the party communicating with the individual who has actuated the voice recording device is recorded and the individual subsequently listens to the recorded voice information.

Another system service is one in which charges are calculated independently without receiving billing information from a line. More specifically, various information such as speed dial numbers (on a system basis), time per call and telephone numbers which may be called free of charge is provided as working data, and the charge of a call on an outside line is calculated in pseudo-fashion (i.e., calculating a change at a telephone terminal or PBX independently of billing information sent from a central office) using this information as well as a timekeeping device. As a result, the user is capable of referring to the calculated data in the format shown in FIG. 19.

With the conventional telephone apparatus described above, it is required that the user perform a clearly defined operation when a system service is provided. When the user does not know a special number or when no special key has been assigned, the system service cannot be received.

In the conversation recording/playback function described above, the arrangement is such that only the person starting the voice recording device is capable of playing back a recording. This arrangement is adopted from the viewpoint that the recorded contents can be grasped only by highly specific users, such as parties to the conversation or parties closely related thereto.

As a consequence, when a certain user records the contents of an information service via an outside line and another user subsequently places an outgoing call for the same information service, the recording/playback function is rendered uneconomical since the earlier recorded information service is not put to practical use at all. Moreover, the recorded resources are not used effectively.

More specifically, if a user utilizes a chargeable audio information service such as a recording of a weather forecast, in the prior art the user himself places a call to central office line whenever this service is used. That is, when numerous users of the telephone apparatus utilize a chargeable audio information service such as the recording of a weather forecast, the telephone charge becomes very high because these users each place a call to central office line whenever this information service is utilized. On the other hand, in a case where the telephone apparatus is equipped with a voice recording device capable of recording and playback, a method is conceivable in which the service voice information which arrives at this device is recorded and provided to the user of the telephone apparatus. However, in a case where the conventional voice recording device records the voice information of the party communicating with the individual that started the device, this individual is the only one who hears the recorded voice information, as mentioned above. Since an unspecified large number of persons cannot listen to the voice information, it is impossible to utilize the voice recording device efficiently.

With a telephone apparatus in which calls are billed independently, there are instances in which the charges for some calls cannot be calculated accurately. For example, in the case of a Number Information Service, 30 yen is charged for one inquiry, but the telephone apparatus is incapable of determining how many inquiries were made by a single call and therefore the billing information is inaccurate.

SUMMARY OF THE INVENTION

An object of the present invention is to provide a telephone apparatus in which voice information from an external supplier of information as well as accurate billing information can be obtained without the user being aware of it.

According to the present invention, the foregoing object is attained by providing a telephone apparatus comprising memory means for storing dial numbers and prescribed services corresponding to the stored dial numbers, determining means for determining a prescribed service corresponding to a dial number inputted to place a call, and executing means for executing the service, which has been determined by said determining means to correspond to the inputted dial number. Such services may include telephone number information service, weather forecast service and the like.

Further, according to the present invention, the foregoing object is attained by providing a telephone apparatus comprising memory means for storing dial numbers and prescribed services in correlated form, determining means for determining a service corresponding to a dial number inputted in order to place a call, executing means for executing the service in accordance with the determination made by the determining means, and storage means for storing billing information in dependence upon the number of times the service is executed.

Another object of the invention is to provide a telephone apparatus in which voice information that has been obtained can be effectively exploited to economize on call charges.

According to the present invention, the foregoing object is attained by providing a telephone apparatus having recording means for recording/playing back voice information from a line, comprising memory means for storing dial numbers and operating modes of the recording means related to stored dial numbers, and determining means for determining an operating mode corresponding to a dial number inputted to place a call, the recording means operating in the operating mode determined by the determining means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing a dedicated telephone accommodated in the key telephone apparatus according to the first embodiment;

FIG. 5 is a diagram showing the format of working data for a system service according to the first embodiment;

FIG. 9 is a diagram showing the constitution of working data according to the modification;

FIG. 12 is a diagram showing the constitution of working data according to the other modification.;

FIG. 15 is a table showing the correspondence between automatic call times and telephone numbers in the private branch exchange system according to the second embodiment;

FIG. 17 is a diagram showing the storage state of recorded results in the private branch exchange system according to the second embodiment;

FIG. 19 is a diagram showing the format of call particulars as an example of a conventional system service.

DESCRIPTION OF THE PREFERRED EMBODIMENTS

<First Embodiment>

Figure 1:
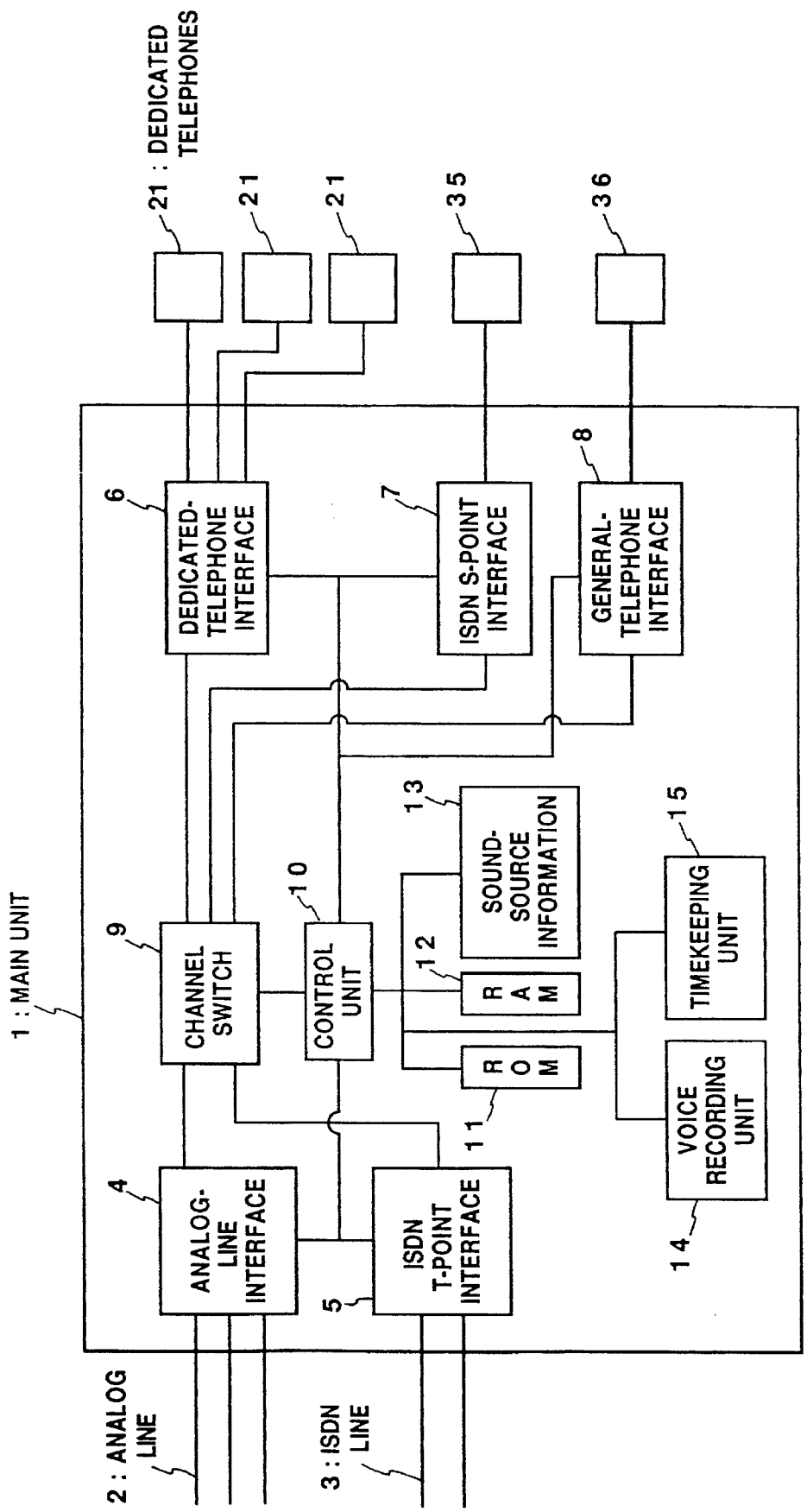
FIG. 1 is a system block diagram of a key telephone apparatus according to a first embodiment of the present invention.

FIG. 1 is a system block diagram of a first embodiment of the invention and shows a key telephone apparatus which accommodates a plurality of outside lines and extensions.

In this embodiment, a main unit 1 which is the center of control in a key telephone apparatus accommodates a plurality of analog lines 2 and ISDN lines 3. The main unit 1 has an analog-line interface 4 for transmitting a dialed number to the analog lines 2, a T-point interface 5 of the ISDN lines 3, a dedicated telephone interface 6 for accommodating dedicated telephones 21 as extensions, an S-point interface 7, which accommodates an ISDN terminal 35, of the ISDN lines 3, a general telephone interface 8 for accommodating a general telephone 36 and a facsimile apparatus, and channel switch 9 for switching/connecting channels between the outside lines and extensions.

The main unit 1 further includes a controller 10 comprising a microprocessor or the like for controlling the operation of the key telephone apparatus, a ROM 11 which stores a program describing the system operation, a RAM 12 which stores the working data for the system, set data for every terminal and billing information, a sound-source information memory 13 for a holding tone and dial tone, a voice recording unit 14 for recording and playing back telephone conversations and answer messages, and a timekeeping unit 15 for measuring time and notifying the controller 10 of events such as time-out.

As shown in FIG. 2, each dedicated telephone 21 accommodated in this key telephone apparatus has a communication interface 22 for establishing a control channel and an information channel with the main unit 1, a control unit 23 for controlling the operation of the dedicated telephone 21, a display unit 24 for displaying various information such as a dialed number, a speaker 25 for amplified reception of a call, a microphone 26 which allows the user a hands-free talk back, a handset 27 into which the user may speak, a speech network 28 for changing over between the speaker 25 and microphone 26 and the handset 27, dial buttons 29, function buttons 30 used when putting a call on hold and when setting various data, and outside-line buttons 31 used to acquire an outside line or to answer.

The operation of the key telephone apparatus 1 according to this embodiment will now be described with reference to the flowcharts shown in FIGS. 3 and 4.

In the following, the term "terminal" shall be used as a generic expression for a dedicated telephone, a general telephone, etc.

Figure 3:
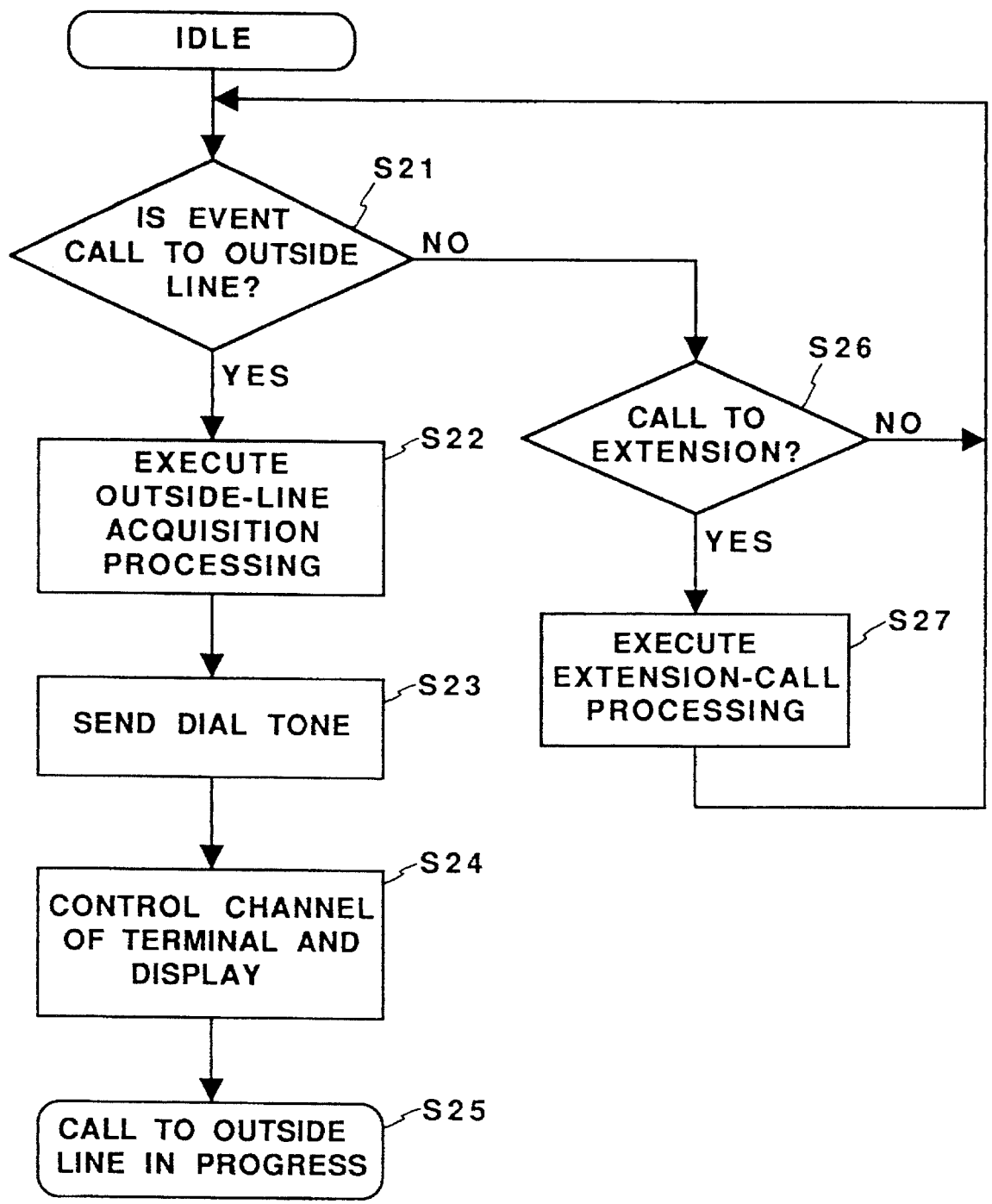
FIGS. 3 and 4 are flowcharts illustrating the operation of the key telephone apparatus according to the first embodiment.

In the flowchart of FIG. 3, the terminal is initially in an idle state. At step S21, the controller 10 waits for an event to take place in the prevailing state. Here the term "event" is taken to mean an operation by the user or the expiration of a certain period of time.

When the user of the terminal places a call to an outside line, the controller 10 waiting for such an event to occur executes outside-line acquisition processing at step S22. This processing involves sending an instruction to the outside-line interface 4 or to the T-point interface 5 of the ISDN and searching for an idle outside line to make it possible to place a call.

Next, if the terminal at which the operation was performed for calling the outside line is, say, a dedicated telephone, then the controller 10 connects the sound-source information 13 and the dedicated telephone 21 through the channel switch 9, thereby sending a dial tone to the dedicated telephone 21 at step S23. The channel of the terminal and the display are then controlled at step S24. As a result, at step S25 the prevailing operating state becomes one in which a call to the outside line is in progress. Accordingly, the user hears the prescribed dial tone and is thus prompted to press the dial buttons.

If the event at step S21 is not one in which the outside line is called, the program proceeds to steps S26 and S27, where processing, such as that for placing a call to an extension, is executed in response to another event which takes place in the idle state. A description of this processing is omitted.

Next, the processing for the state in which a call to the outside line is in progress will be described in accordance with the flowchart of FIG. 4.

First, at step S31, it is determined if the event is the dialing of a number. If the answer at this step is "YES", then a dialed-number storage area is updated at step S32. The dialed-number storage area is secured in the RAM 12 in correlation with the terminal and is used in order to memorize a dial number having a fixed number of digits. This is followed by step S33, at which the dial number is sent to the outside line, and then by step S34, at which it is determined whether there are numbers which agree with the number sent thus far and the service number of an outside facility in the RAM 12.

The format of working data which characterizes a system service in accordance with the embodiment will now be described with reference to FIG. 5.

In FIG. 5, a first column 41 stores identification numbers assigned to respective ones of the outside lines; a second column 42 stores the numbers of services rendered by outside facilities; a third column 43 stores system services, which are rendered by the present system, that may be added to a service to be executed when the number of the service stored in the second column 42 has been dialed; a fourth column 44 contains flags which indicate whether a system service is actually to be carried out; and a fifth column 45 stores other setting information.

Figure 4:
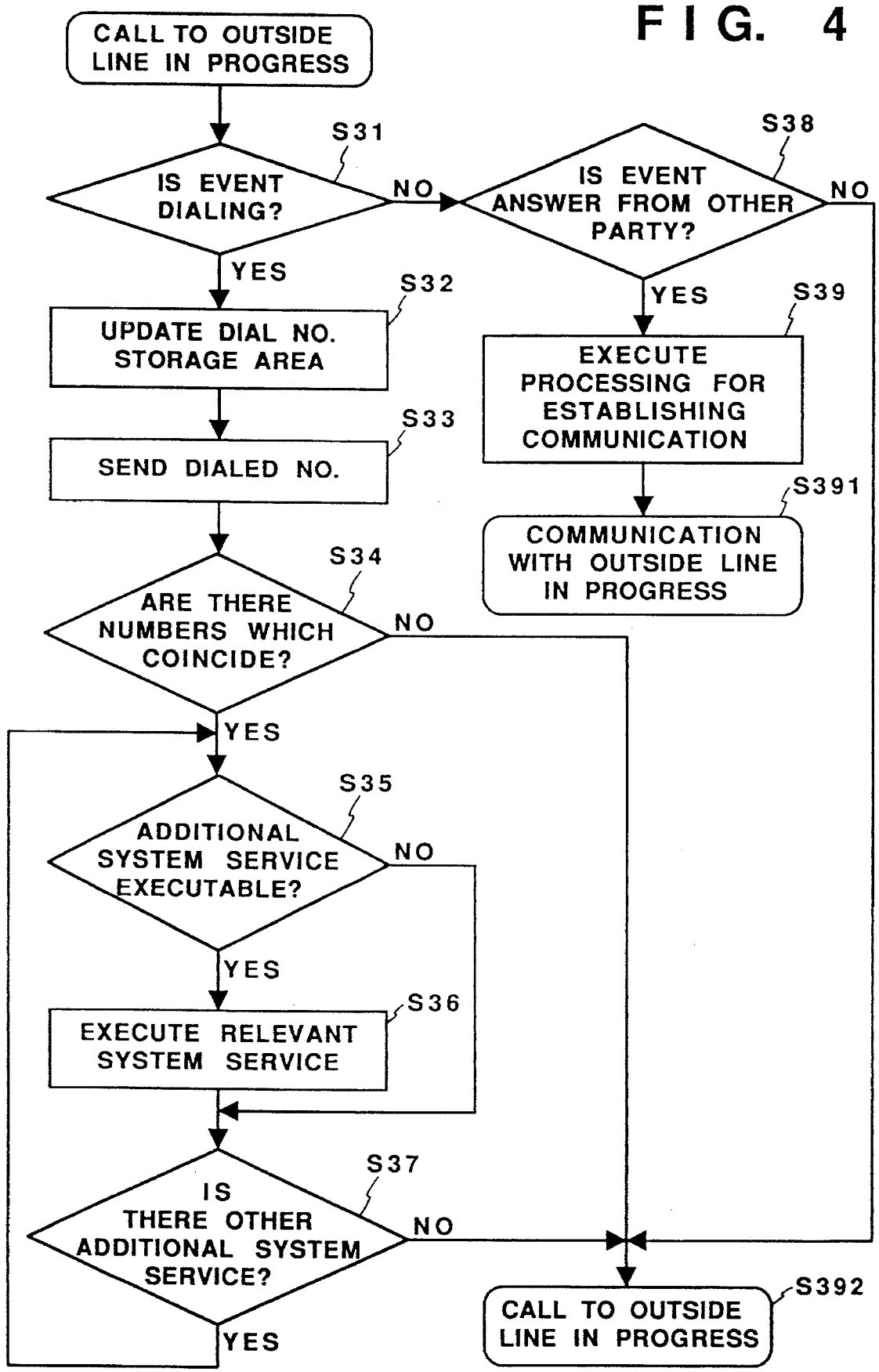

If the determination made at step S34 in FIG. 4 is that there are no numbers which agree with the sent number and the outside service number, then the next event is awaited at step S392 in the state in which the call to the outside line is in progress. If there are numbers which coincide with the sent number and the outside service number, however, it is determined at step S35 whether a service that may be added is executable or not. If the service is executable, then the relevant processing is performed at step S36 such as memo dial and conversation recording as illustrated in column 43 of FIG. 5. After execution of the relevant system service has been performed with regard to all services registered in the system, it is determined at step S37 whether there is another system service to be added. If the answer is "NO", then the next event is awaited at step S392 in the state in which the call to the outside line is in progress. If there is another system service, the program returns to step S35.

If the event at step S31 is not the dialing of a number, then it is determined at step S38 whether the event is a response from another party. If the answer is "YES", then processing for establishing communication with the terminal is performed at step S39. The terminal is then placed in communication with the outside line at step S391.

If it is determined at step S38 that the event is not a response from another party, then the terminal is placed in the state in which a call to the outside line is in progress (step 392).

As a specific example, a case will be described in which the user has dialed "104", which is a telephone-number information service.

As shown in FIG. 5, this number has been registered as working data, and "Memo Dial" is executable. Therefore, after the dial number "104" is sent, the present system is placed in the memo dial mode. Thereafter, the dial number entered by the user is stored in a memo-dial storage area of the RAM 12.

If a redial key (not shown) is depressed later, the controller 10 originates a call in accordance with the dial number stored in the memo-dial storage area. Accordingly, it is unnecessary for the user to prepare memo paper in advance in order to take a memo of the number, it is unnecessary to assign a memo-dial key, and there is no need to enter a special number.

In the above-described embodiment, an arrangement can be adopted wherein the timing at which an additional system service is executed occurs after the other party has answered and communication has been established with an outside line, rather than during the placing of a call to an outside line.

Further, an arrangement can be adopted wherein the timing of communication with an outside line occurs a fixed period of time after a number is dialed.

Thus, in accordance with the key telephone apparatus of this embodiment, a system service may be received automatically, without the user being aware, even if the user does not know a special number and even if a special key has not been assigned.

<Modification 1>

A first modification of the first embodiment will now be described. The key telephone apparatus according to this modification has the same construction as that of the first embodiment, and therefore the construction need not be described.

Figure 6:
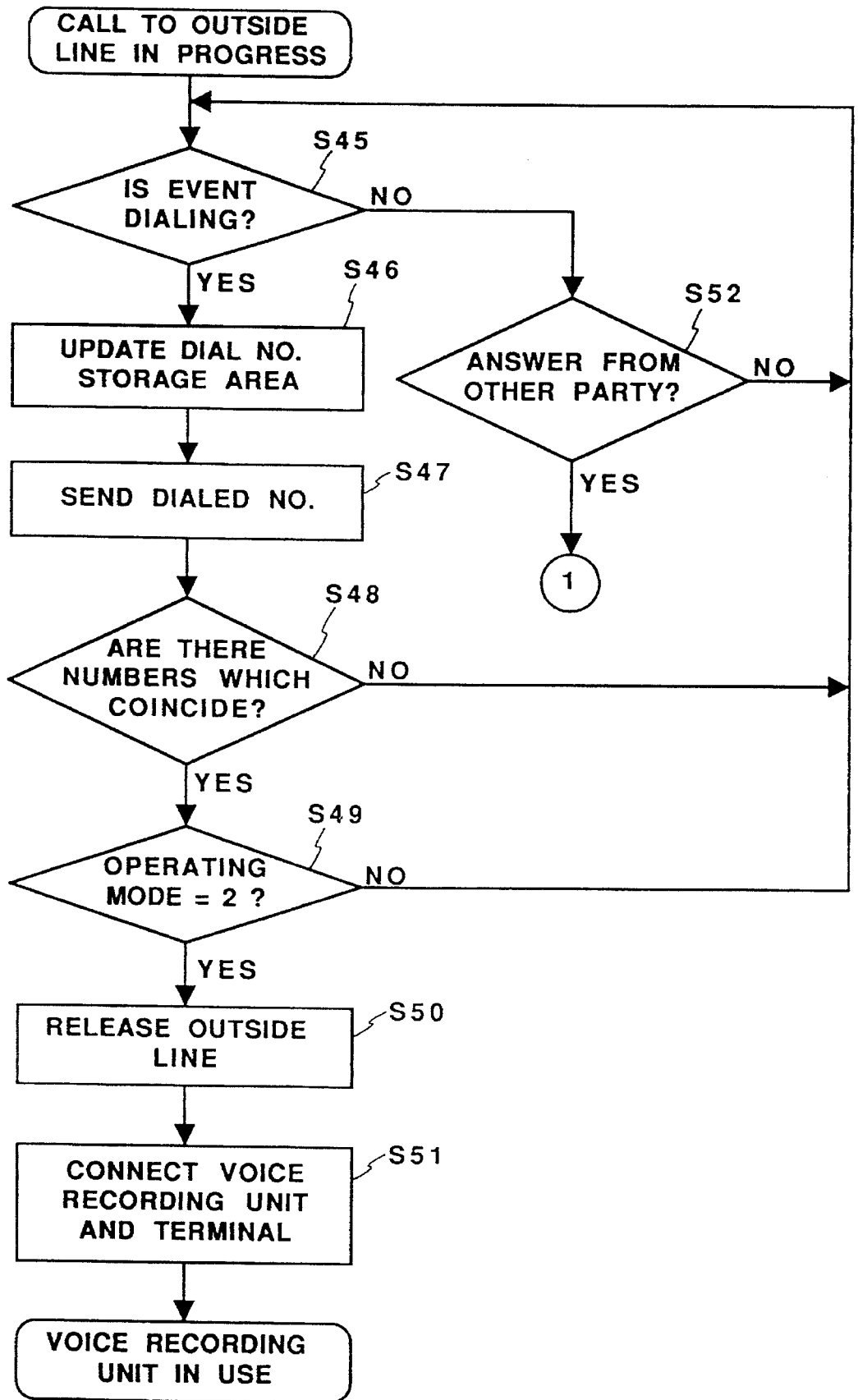
FIGS. 6 through 8 are flowcharts illustrating the operation of a key telephone apparatus according to a modification of the first embodiment.
Figure 7:
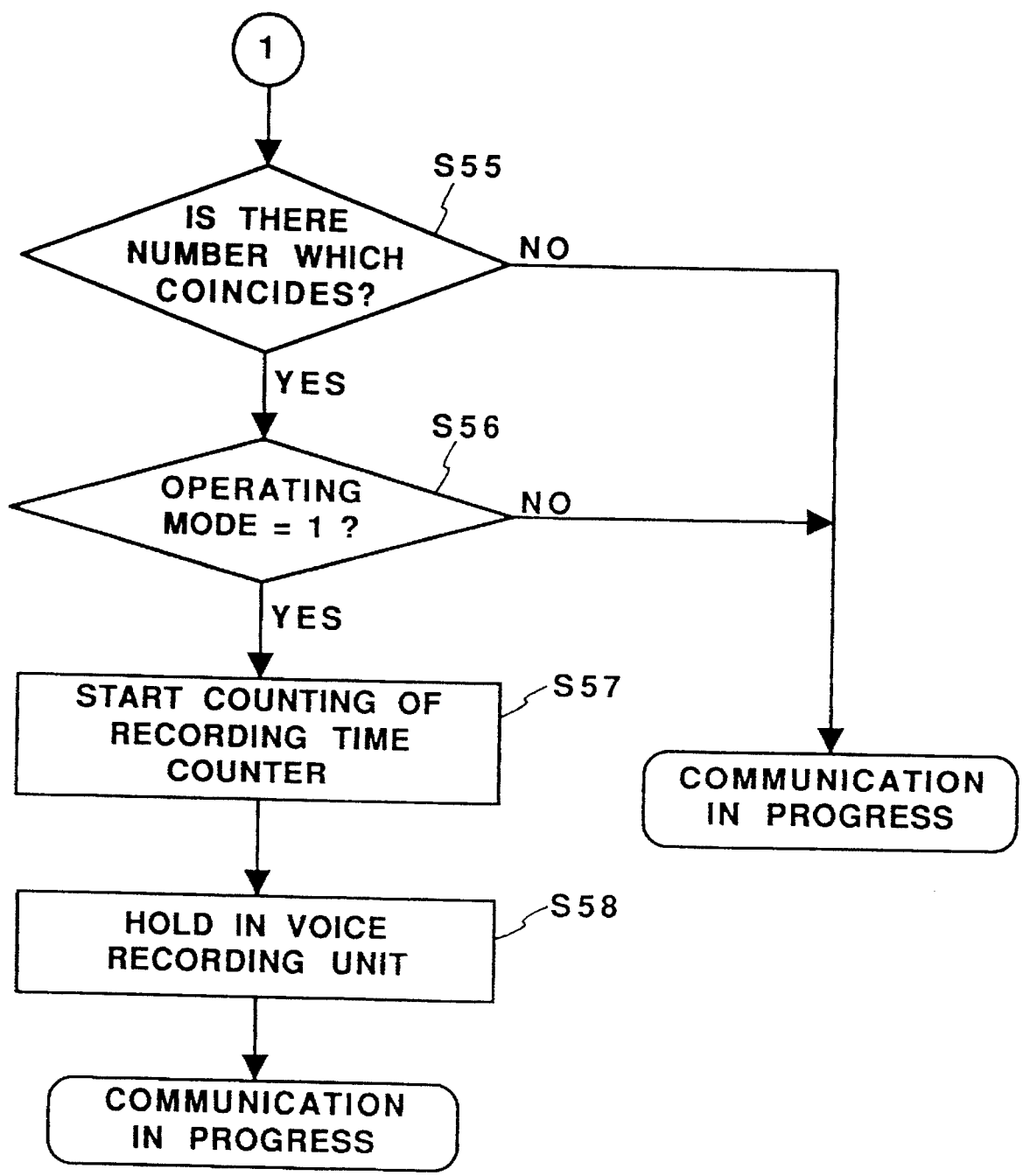
Figure 8:
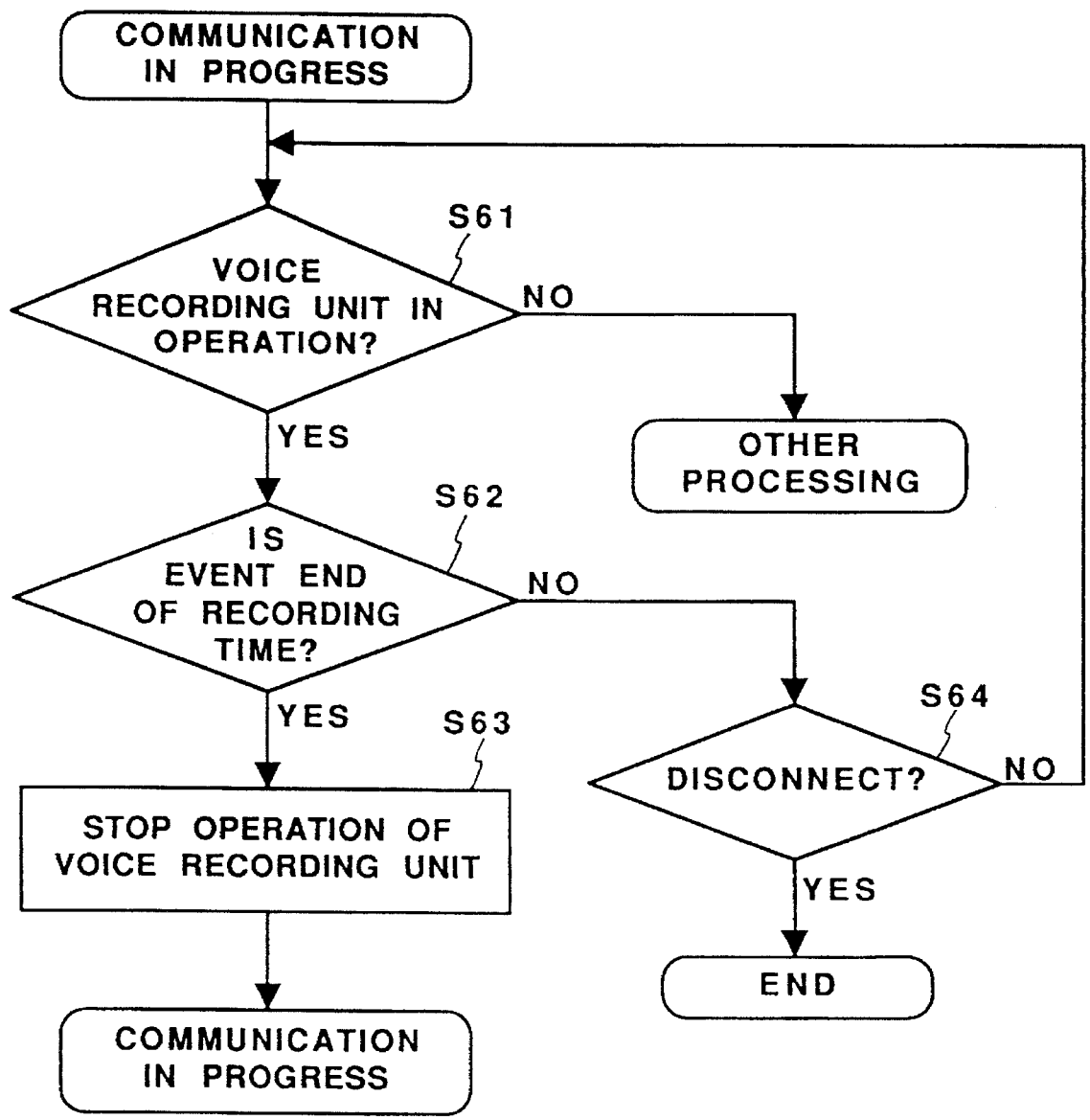

FIGS. 6 through 8 are flowcharts illustrating the operation of the key telephone apparatus according to this modification.

In the key telephone apparatus according to this modification, agreement (i.e., a match) between a service number and a dial number in the RAM 12 during a dial event is discriminated at steps S45 through S48 in FIG. 6, in the same manner as at steps S31 through S34 in FIG. 4.

If a number which agrees is found at step S48, the operating mode in the working data, described below, is examined at step S49. When the operating mode is "2", a playback mode, the call to the outside line is abandoned at step S50 and the voice recording device 14 is connected to the terminal 21 at step S51 so that a transition is made to a state in which the voice recording device 14 is in use. Then a voice already stored in the voice recording device 14 is played back.

If the operating mode is found to be other than "2" at step S49, an event is awaited while the state in which the call to the outside line is being made is maintained. When the next event is an answer from another party ("YES" at step S52), it is determined at step S55 (FIG. 7) whether there is a number which agrees with the called number and the number in a column 52 (FIG. 9). When there are numbers which agree, the operating mode is examined at step S56. When the operating mode is "1", a storage mode, timer counting for recording time is started at step S57 and the call audio is preserved in the voice recording device 14 at step S58 so that the terminal is placed in a state of communication.

On the other hand, when an event occurs in the state in which conmmunication is in progress, it is determined at step S61 in FIG. 8 whether the voice recording device 14 is in operation, and the type of processing is decided by the event. More specifically, when the event is found to be the end of timer counting ("YES" at step S62), the operation of the voice recording device 14 is halted. In the case of another event, it is determined at step S64 whether the call is to be disconnected.

FIG. 9 is a diagram for describing the constitution of working data in this modification.

In FIG. 9, a first column 51 stores identification numbers assigned to respective ones of the outside lines; a second column 52 stores the numbers and names of services rendered by outside facilities; a third column 53 stores information which decides the operating mode of the voice recording device which prevails when a number in column 52 is dialed, and a fourth column 54 stores other information.

Column 53 will now be described in detail. First, the "Operating Mode" may be any of the following:

(1) a mode for calling an outside line and updating the contents of the voice recording device;

(2) a mode which uses the voice recording device in the system; and (3) a mode for ordinary operation (solely for calling an outside line).

"Update Timing" indicates the timing at which recorded contents are updated. For example:

(1) every six hours: update at 00:00, 06:00, 12:00, 18:00;

(2) successively: update each time; etc.

"Time of Previous Update" indicates the latest date and time at which recorded contents were updated. "Recording Time" indicates the time indicates the time during which recorded contents are stored.

As one example, a case will be described in which the user dials the number "177", which is a weather forecasting service.

This number is registered as working data, as shown in FIG. 9. Since the operating mode is "2", the voice recording device 14 and the terminal 21 are connected without calling an outside line, and the user is allowed to hear contents recorded previously. It should be noted that the sending of the dialed number is not performed sequentially; instead, the number may be sent after it has been judged that it is necessary to call an outside line. Thus, by arranging it so that the voice recording device is made to operate in accordance with the set mode when a call is placed to a specific number, the call recording function can be used economically and resources can be employed efficiently.

<Modification 2>

A second modification of the first embodiment will now be described. The key telephone apparatus according to this modification has the same construction as that of the first embodiment, and therefore the construction need not be described.

Figure 10:
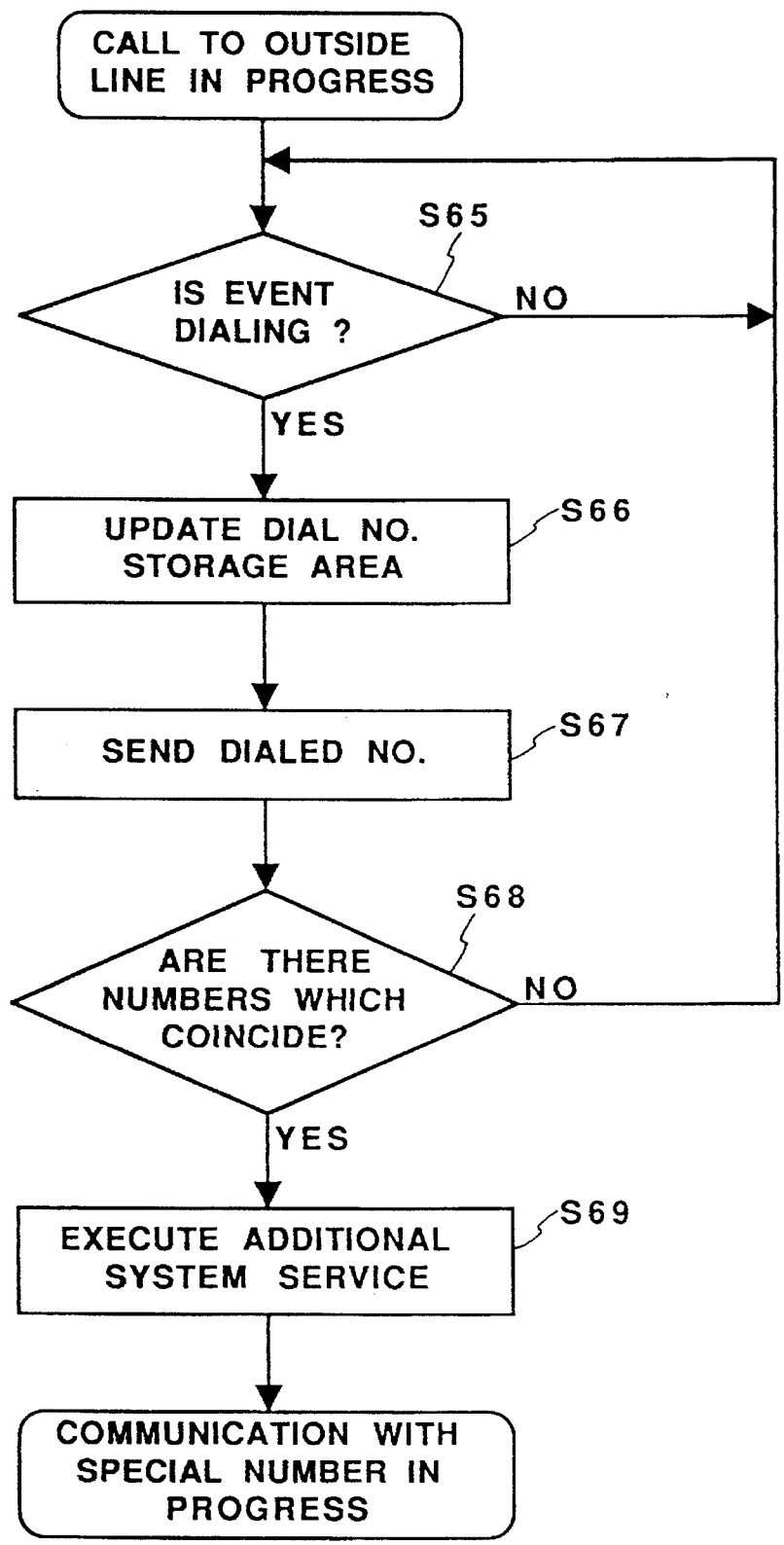
FIGS. 10 and 11 are flowcharts illustrating the operation of a key telephone apparatus according to another modification of the first embodiment.
Figure 11:
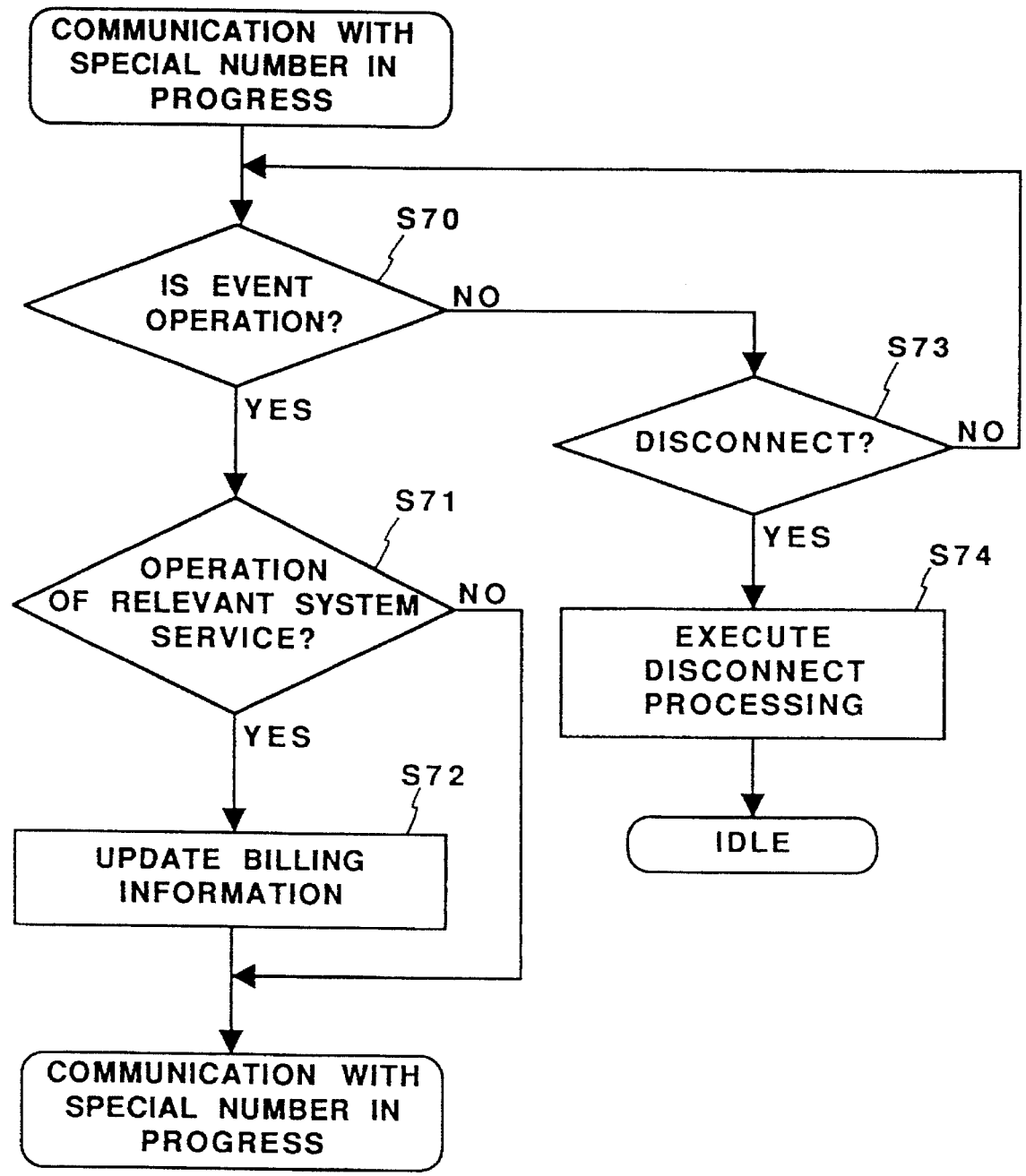

FIGS. 10 and 11 are flowcharts illustrating the operation of the key telephone apparatus according to this modification.

In the key telephone apparatus according to this modification, coincidence between a service number and a dial number in the RAM 12 during a dial event is discriminated at steps S65 through S68 in FIG. 10, in the same manner as at steps S31 through S34 in FIG. 4. Following the discrimination step (S68), the service (e.g., memo dial) to be added is executed at step S69, after which the apparatus makes a transition to a state in which communication with a special number is in progress.

If the event is an operation related to an added system service while communication with the special number is in progress ("YES" at step S71 in FIG. 11), billing information is updated in accordance with the unit charge at step S72 and a counter column 64 (FIG. 12) is incremented.

FIG. 12 is a diagram showing the constitution of working data in this modification.

In FIG. 12, a first column 61 stores identification numbers assigned to respective ones of the outside lines; a second column 62 stores the numbers of services rendered by outside facilities; a third column 63 stores system services, which are rendered by the present system, that may be added to a service to be executed when the number of the service stored in the second column 62 has been dialed; a fourth column 64 stores a counter which indicates the number of times the service has been executed; a fifth column 65 stores unit charge; and a sixth column 66 stores.

As a specific example, a case will be described in which the user has dialed "104", which is a telephone-number information service.

As shown in FIG. 12, this number has been registered as working data, and the memo dial mode is effective. The memo dial mode referred to here is a mode in which, whenever the user asks for a desired telephone number by virtue of the telephone-number service, this number is inputted from the dial buttons 29 and the number is stored in the above-mentioned dial storage area. Whenever the user performs this memo dial operation, the user is billed 30 yen, which is the unit charge. As a result, accurate billing information can be obtained.

It is permissible to detect the number of times a system service is executed based upon the key input operation of the user which indicates an execution of the service each time the service is executed, rather than relying upon an arrangement in which the dial input operation is performed in the memo dial mode.

Further, it is permissible to adopt an arrangement in which the execution of a system service to be added is not performed immediately after the sending of the dial number, as in the foregoing modification. Instead, the system service can be executed after a state of communication has been attained, namely after it has been determined that communication is in progress owing to an answer from another party.

Furthermore, the operation for updating the billing information may be performed collectively after the call ends, rather than each time a system service is executed.

Thus, since billing information is updated in accordance with the number of executions of a system service, more accurate billing information is obtained by virtue of a natural user operation.

<Second Embodiment>

A second embodiment of the present invention will now be described.

Figure 13:
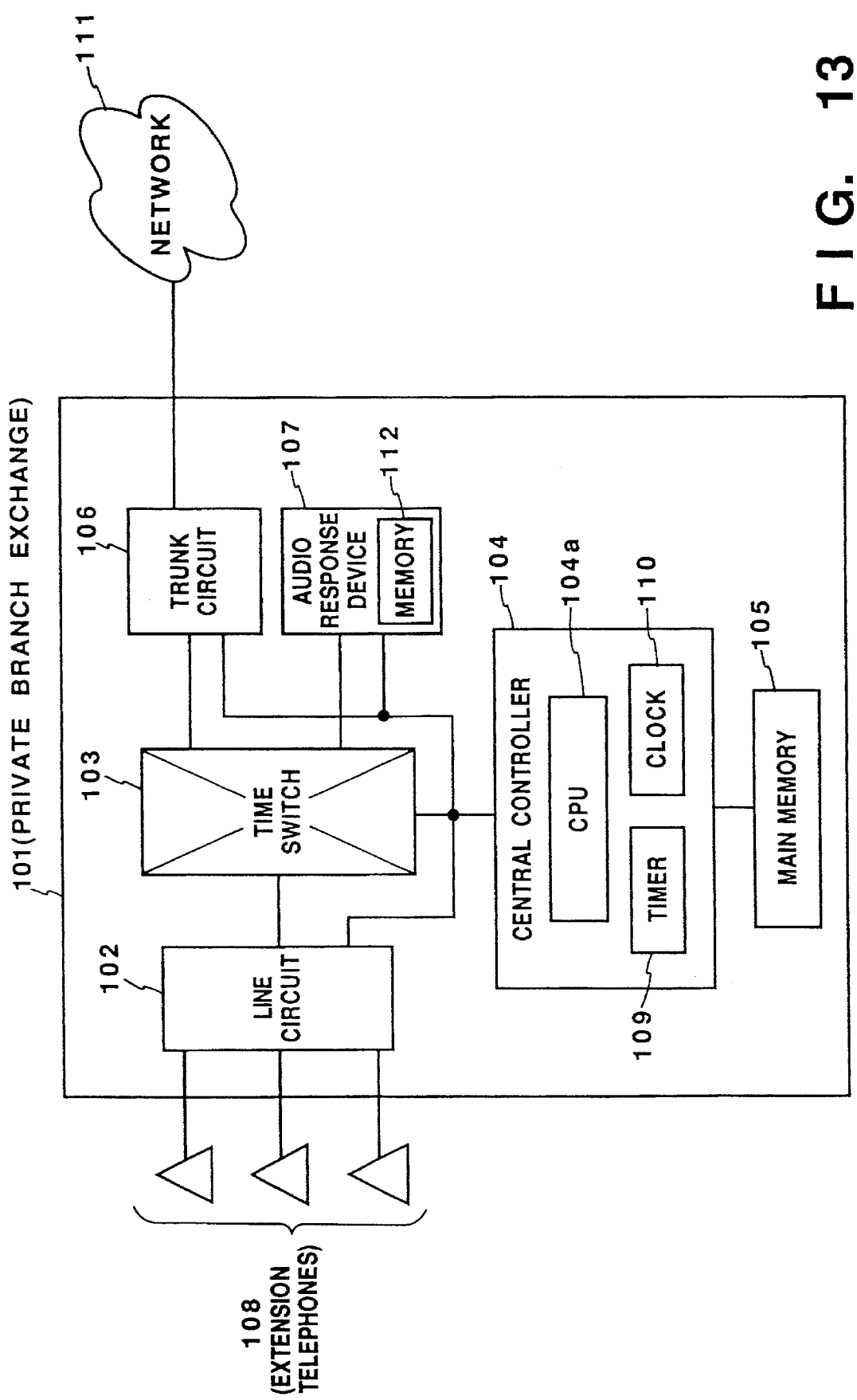
FIG. 13 is a block diagram of a private branch exchange system according to a second embodiment of the present invention.

FIG. 13 is a block diagram of a private branch exchange system according to a second embodiment of the present invention. As shown in FIG. 13, a private branch exchange 101 has a line circuit 102, a time switch 103, a central control unit 104, a main memory 105, a trunk circuit 106, and an audio response device 107. A plurality (three in this embodiment) of extension telephones 108, which are extension terminals, are connected to the line circuit 102.

The time switch 103 performs changing over of the channel. The central control unit 104, which controls the exchange 101 in various ways, has a timer 109 for deciding the timing necessary for control, and a clock 110 serving as the timekeeping means of the private branch exchange 101. The main memory 105 stores various data necessary for the operation of the private branch exchange 101.

A network 111 is connected to the trunk circuit 106. The audio response device 107 records and playing back audio information for an audio response. Audio-response signal data is stored in a read/write memory 112 provided in the audio response device 107.

Figure 14:
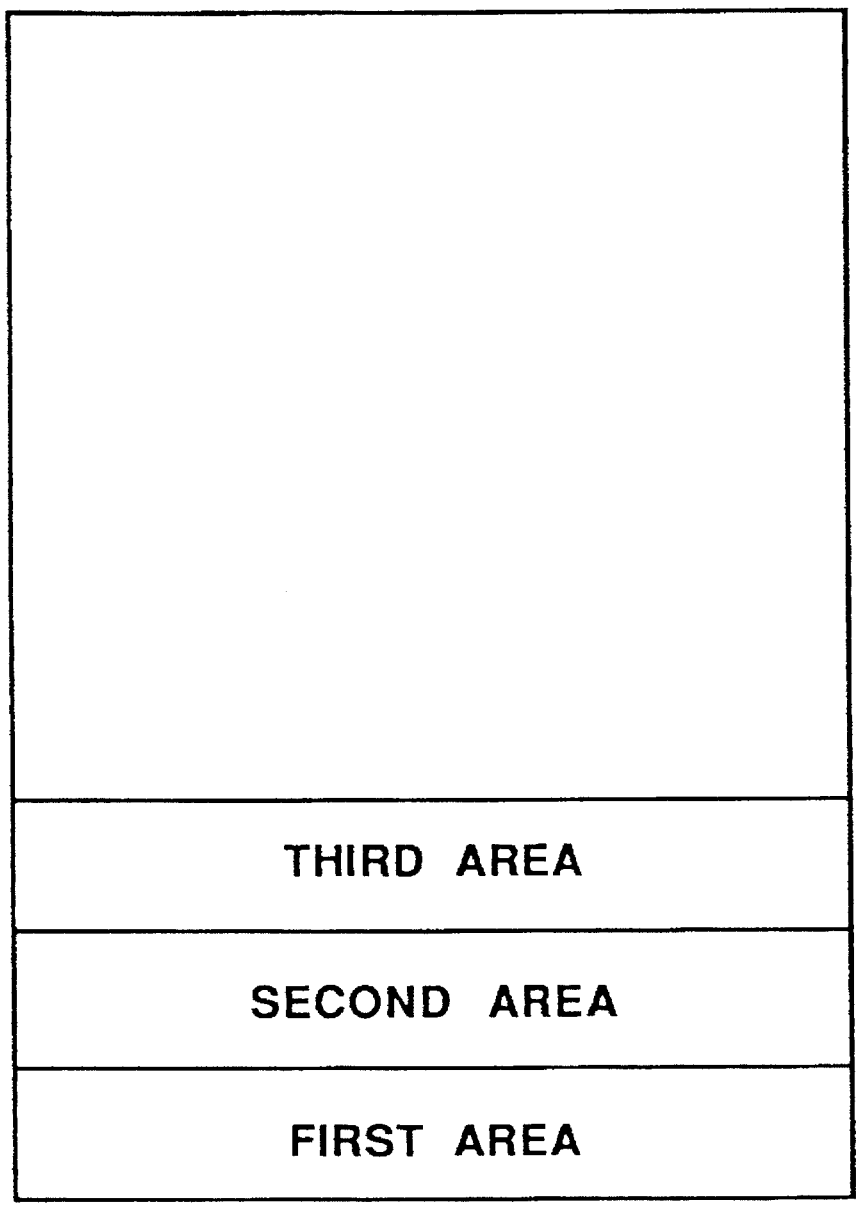
FIG. 14 is a diagram showing a memory map of the private branch exchange system according to the second embodiment.

FIG. 14 illustrates an example of the memory map of memory 112. Of addresses "0000" to "FFFF" of the memory 112 that can be used for audio response, in this example the addresses from "0000" to "2FFF" are used for providing a service in which audio information from a party to a call can be recorded and the recorded audio information can be heard by anyone from an extension terminal.

The memory map is divided into three areas. The area between addresses "0000" and "0FFF" is a first area, that between addresses "1000" and "1FFF" is a second area, and that between addresses "2000" and "2FFF" is a third area. Three types of audio information are capable of being recorded by the first through third areas. However, these areas need not be fixed. It is permissible to adopt an arrangement in which the audio response unit 107 or a CPU 104a of the central control unit 104 manages use and non-use of the above-mentioned areas.

The operation of the private branch exchange of this invention constructed as set forth above will now be described.

When audio information provided by a certain service is recorded in the audio response device 107, the operator of the extension telephone 108 dials the office number of the service provider and places an outgoing call. When the line is connected, the service starts to be provided and the flow of audio information begins, the operator dials a special number for recording-start as well as a recording area number (e.g., "1" in case of the first area in FIG. 14) when a point in the flow of information is reached at which it is desired to make a recording.

In response to dialing of special number of starting recording, the central control unit 104, which has received the recording-start instruction, controls the time switch 103 to form a channel from the outside line of the service provider to the audio response device 107 and input digital audio signal data of pulse-code modulated audio information to the audio response device 107.

In a case where address management of a recording area is being carried out by the voice response device 107 at the same time, the central controller 104 sends the recording-area number to the audio response device 107, and the latter decides the recording starting address (0000 in case of the first recording area) in the memory 112. In a case where address management of a recording area is being carried out by the central controller 104, the latter designates the recording-start address of the memory 112 based upon the recording area number and starts the recording operation.

In a case where there is only one type of audio information to be recorded, it is no longer necessary for the operator to dial the recording area number in order to designate the recording area. Instead, the central controller 104 will designate a preset recording area for the audio response device 107.

In a case where the recording of the audio information is not started while the provision of the service is in progress but it is desired to record the information from the beginning, a method is adopted in which, when an outgoing call is placed from the extension telephone 108, the office number of the service provider is dialed in addition to a special number which designates recording from the beginning. In this case, the central controller 104 translates the dial number and sends a call to the dialed office number through the trunk circuit 106. When the trunk circuit 106 detects a reversal in the polarity of the outside line due to an answer from another party, the central controller 104 regards this as being an instruction to start recording and initiates recording in a manner similar to that of the foregoing example.

In a case where there is no reversal in polarity, the timer 109 within the central controller 104 is actuated after the dialing of the outside line ends. When a time period sufficient for allowing a response from the other party elapses, this is regarded as being an instruction to start recording.

There are three methods available in order to end the recording operation of the audio response device 107. One is a method based upon a special number for ending recording, one is a method based upon a check of recording time, and one is a method based upon a recording area restriction.

In the method based upon the special number for ending recording, the central controller 104 controls the time switch 103 as soon as it recognizes the dialing of the special number during recording. Owing to such control, the channel from the outside line to the audio response device 107 is disconnected and the audio response device 107 is instructed to end the recording of the audio signal, as a result of which the audio response device 107 terminates the recording operation. With this method, it is possible to record audio information solely over an interval desired by the user.

In the method based upon a check of recording time, the timer 109 within the central controller 104 is actuated at the moment recording starts. The end of recording is designated at expiration of a preset period of time (e.g., two minutes).

In the method based upon restriction of the recording area, the size of a recording area, which is designated when recording is started, is predetermined. If recording in excess of an area of this size is about to occur, the audio response unit suspends the recording operation.

The method of checking recording time or the method based upon restriction of the recording area is effective in preventing excessive consumption of memory in a case where the user forgets to designate the end of recording by an operation such as dialing a special number.

In a case where audio information recorded by the foregoing methods is to be heard using the extension telephone 108, the operator of the extension telephone 108 dials in a playback-designating special number, which designates playback of the audio information recorded by the audio response device 107, as well as a number which indicates the playback area. More specifically, if the playback-designating special number is "No. 25" and it is desired to playback a playback area number "No. 1", the operator dials "251". Alternatively, it is permissible to make a presetting of the type in which the playback-designating special number is "No. 25" designates playback of the audio information that has been stored at playback area "No. 1".

If there is an understanding between the person making the recording and the person listening to the recording to the effect that specific audio information, such as a weather forecast, will be recorded in the first area, it will be possible to designate the playback area number easily.

Upon receiving the dial number, the central controller 104 controls the time switch 103 to form a channel from the voice response device 107 to the extension telephone 108, informs the voice response device 107 of the playback area and designates playback.

As a result, the voice response device 107 starts playback of the recorded contents from the beginning of the playback area and the operator is allowed to hear the audio information by means of the extension telephone 108. When the operator of the extension telephone 108 performs a playback suspending operation, such as by taking the receiver off the hook, the central controller 104 causes the audio response device 107 to cease playback. When the playback suspending operation is not performed, the audio response device 107 performs playback up to the end of the playback area and then informs the central controller 104 of the end of playback. When this is done, the central controller 104 cuts off the channel to the extension telephone 108 and ends playback processing.

If it is feared that a recording may not be understood perfectly by only a single playback operation, playback is repeated a predetermined number of times. A method of discriminating the end of a playback area is to detect the end of the area if it is fixed and adopt this as the end of the playback area. Alternatively, a recording-end address which prevails when there is a designation to end recording of the audio response device may be stored in the main memory 105 in advance, and this may be adopted as the end of the playback area.

In this embodiment, it is assumed that the extension telephone 108 is a single line telephone, and the instructions for starting and ending recording and playback are issued by special numbers. However, if the extension telephone 108 is a multiple-function telephone having various function buttons, the start and end of recording and playback may be designated using these function buttons. If this expedient is adopted, special numbers need not be memorized and operation is simplified since only a single touch of a button will suffice. In addition, designation of area numbers also may be made by operating the function buttons. Furthermore, designation of both area numbers and playback may be made with a single touch of a button.

Thus, when use is made of a chargeable audio information service such as a weather forecast, the particular audio information is temporarily recorded in the audio response device 107, and the recorded audio information can be listened to from the extension telephone 108, which is an extension terminal of the private branch exchange 101. As a result, the number of times which an outgoing call is placed to the outside line in order to access the chargeable audio information service may be reduced, thereby achieving the objective of reducing telephone charges.

<Third Embodiment>

In the second embodiment described again, the recording of the audio information can be carried out in response to instructions issued by operating the extension telephone 108. According to this method, if the particulars of information are changed from time to time, as in the manner of a weather forecast, then a recording must be made through the intermediary of the operator each time the information changes. This is laborious and inconvenient. Accordingly, if it is so arranged that the private branch exchange automatically places an outgoing call to the telephone number of the provider of the chargeable audio information service and this audio information is automatically recorded, then the aforementioned inconvenience can be eliminated.

The construction of the private branch exchange system in the third embodiment is the same as that shown in FIG. 13, and therefore this embodiment will be described with reference to FIG. 13. The clock 110 serves as the timekeeping means of the private branch exchange system. This system is so adapted that when a predetermined time arrives, the system automatically places an outgoing call to the telephone number of the provider of the chargeable audio information service. Information indicative of the time of the automatic outgoing call and of the telephone number is stored, in the form of a correspondence table, in the main memory 105. An example of this information is as shown in FIG. 15.

In a case where the weather forecast of the district in which the private branch exchange system has been installed changes over at times "6:00", "12:00", "15:00" and "18:00", for example, "177" is stored in the main memory 105 as the number to which the outgoing call was automatically made, and the times also are stored in the main memory 105 as the times at which the outgoing call was automatically made. The number and the times are stored in correlated fashion, as shown in FIG. 15.

The foregoing method can be applied not only to a weather forecast but also to any chargeable audio information service irrespective of the type thereof. For example, in a case where a "Dial Q2 Service" of the Nippon Telegraph and Telephone Corporation, which is the service provider, is utilized once a day at fixed times, the telephone number of the service provider is stored in the main memory 105 as the number to which the outgoing call was automatically made, and the service utilization times are stored in the main memory 105 as the times at which the outgoing call was automatically made. This is as illustrated in FIG. 15.

Figure 16A:
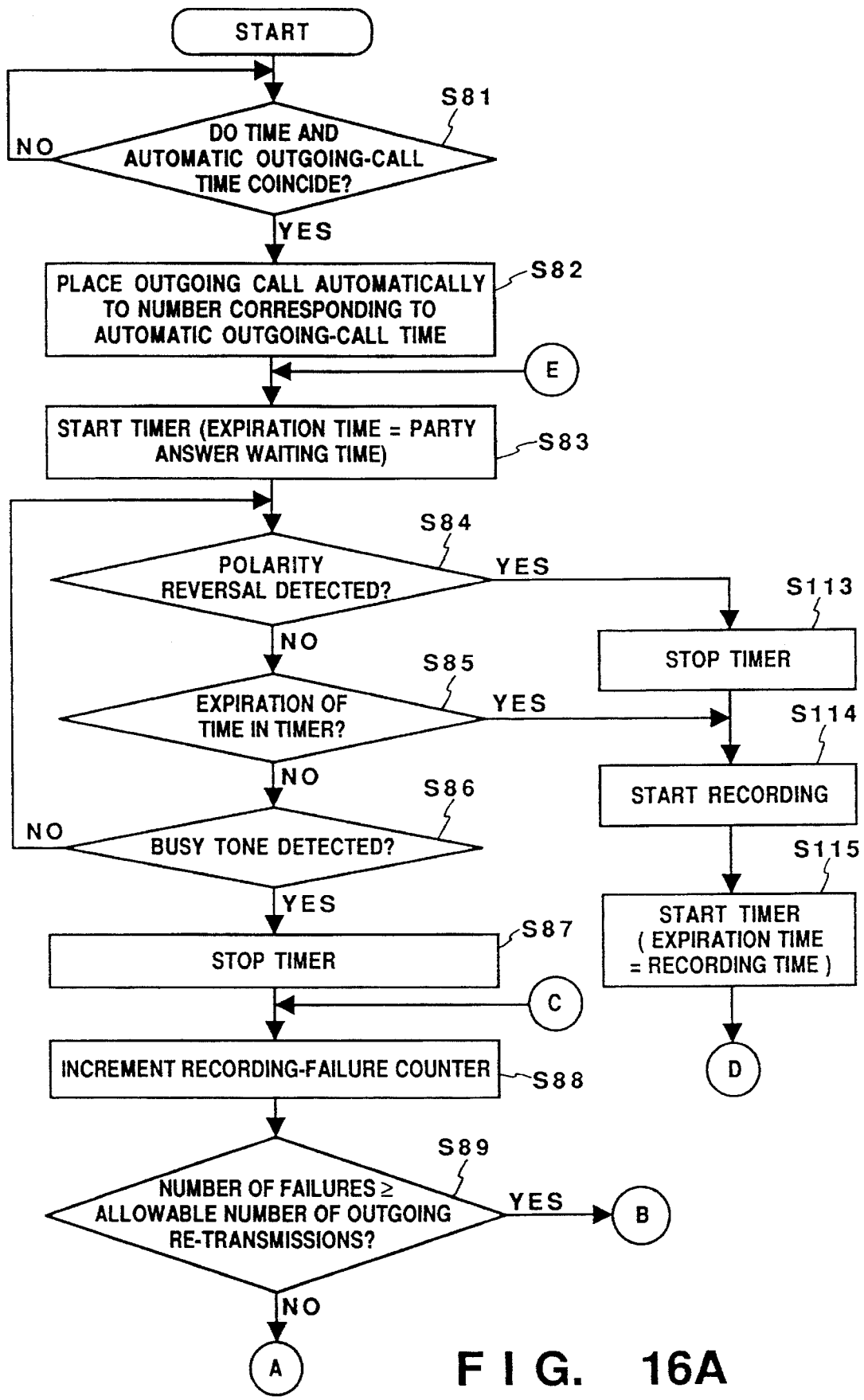
FIGS. 16A through 16C are flowcharts illustrating the operation of the private branch exchange system according to the second embodiment.
Figure 16B:
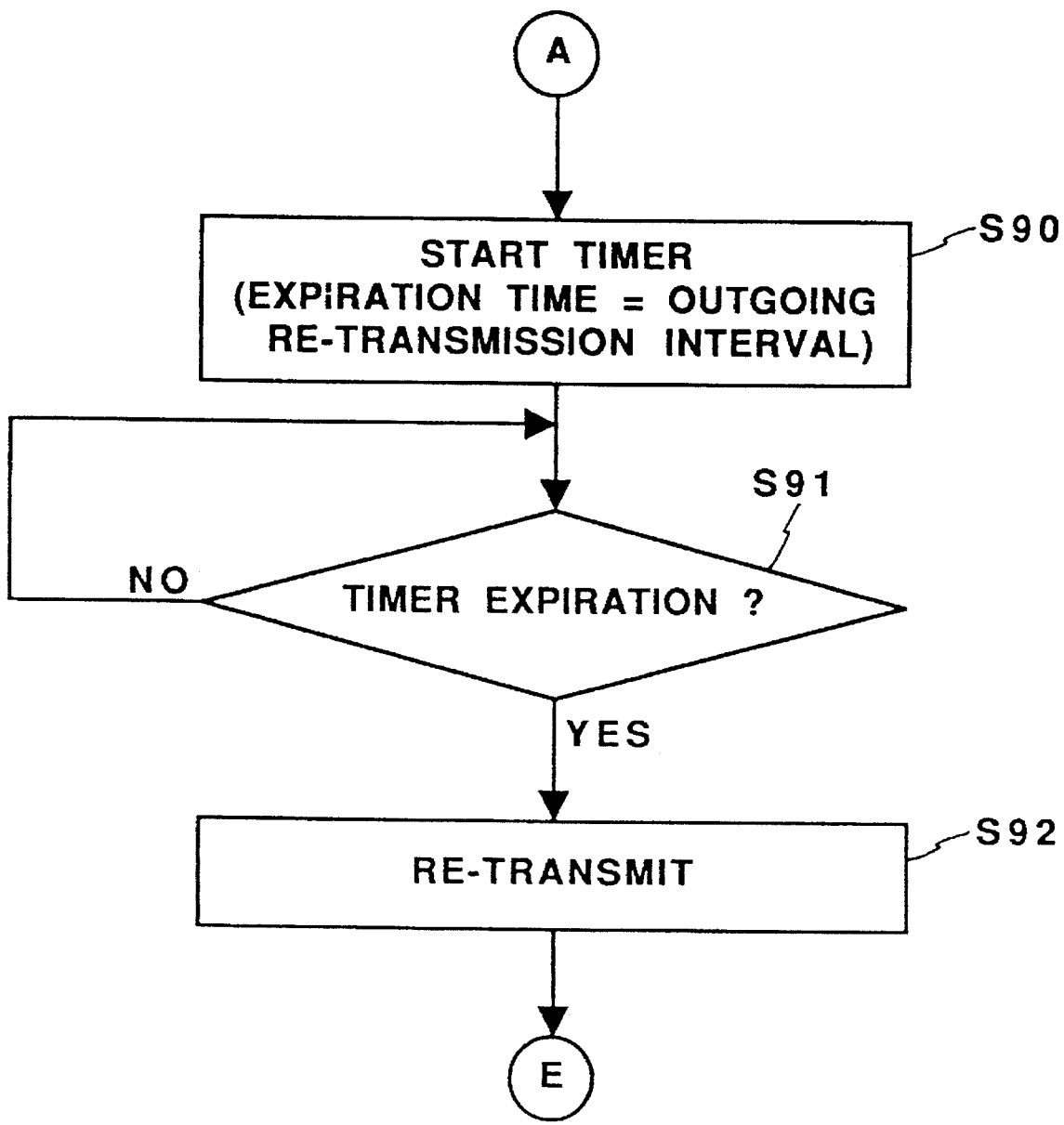

The operation of the private branch exchange system of this embodiment will now be described with reference to the flowcharts of FIGS. 16A through 16C. The clock 110 operates at all times and the CPU 104a of the central controller 104 constantly performs monitoring to determine whether the present time coincides with the automatic outgoing-call time stored in the main memory 105 (step S81). When the present time coincides with the automatic outgoing-call time stored in the main memory 105, the CPU 104a automatically sends an outgoing call, through the trunk circuit 106, to the corresponding automatic outgoing telephone number (step S82).

For example, if the automatic outgoing-call time and the telephone number are set as shown in FIG. 15 and the present time is "6:00", this coincides with one of the predetermined automatic outgoing-call times. Therefore, the central controller 104 sends an outgoing call to the corresponding automatic outgoing-call number "177". When the present time becomes "12:00", this coincides with automatic outgoing-call times for two different types of information services. As a result, an outgoing call is placed first to the provider of one of the information services and the audio information is recorded. Then, when the recording ends, an outgoing call is placed to the provider of the other information service and this audio information is recorded.

In order to achieve this, a flag is provided in the main memory 105 and, if there is an information service to be recorded other than the audio information service currently being recorded, the flag is raised and the telephone number corresponding to this information service is stored in memory. At the end of the initial recording, it is detected whether the flag has been raised. If the flag has been raised, an outgoing call is placed to the telephone number that has been stored, and the audio information provided from this point onward is recorded.

At the end of dialing of the outside line at step S82, the timer 109 is actuated (started) at step S83. The expiration time adopted is one which will allow a sufficient time for an answer from another party in preparation for no reversal in polarity. If there is an answer to an automatic outgoing call at step S82 and the polarity of the outside line reverses ("YES" at step S84), then the trunk circuit 106 detects this and so informs the central controller 104. When this is done, the central controller 104 regards this as being an instruction to start recording and therefore stops the timer 9 at step S113. Recording is then started at step S114 in the same manner as described above in the second embodiment.

The recording area at this time is allocated within the main memory 105 in correspondence with the telephone number in such a manner that overlapping will not occur. The central controller 104 informs the audio response device 107 of the recording area. In order to measure recording time, the timer 109 is started again at step S115 at the same time recording starts.

In a case where there is no reversal of polarity, expiration of time in the timer 109 is regarded as being an instruction to start recording (steps S85 and S114). At this time also the timer 109 is started again at step S115 in order to measure recording time. However, if the trunk circuit 106 detects (step S86) a busy tone before elapse of the waiting time in timer 109 that is for the purpose of allowing an answer from another party, the timer 109 is stopped at step S87 with starting recording. This means that recording has failed without a connection having been made to the party to which the outgoing call has been sent. When recording fails, a recording-failure counter is incremented at step S88.

As shown in FIG. 17, the recording-failure counter represents the number of recording failures in the main memory 105. The values of the count correspond to the area numbers and the automatic outgoing-call dial numbers. The values of the recording-failure counter are checked. If the number of recording failures does not exceed an allowable number in which the outgoing call is re-transmitted in an effort to achieve recording again ("NO" at step S89), then an interval time up to re-transmission of the outgoing call is set as expiration time in order to perform re-transmission after a predetermined time interval, and then the timer 109 is re-started (step S90 in FIG. 16B).

To which telephone number the re-transmission is to be made at this time is stored in the main memory 105 in advance. When the interval up to the re-transmission runs out, the re-transmission is made to the number that has been stored in the main memory 105 (step S92), after which recording is tried again by repeating the procedure from step S83 onward.

Figure 16C:
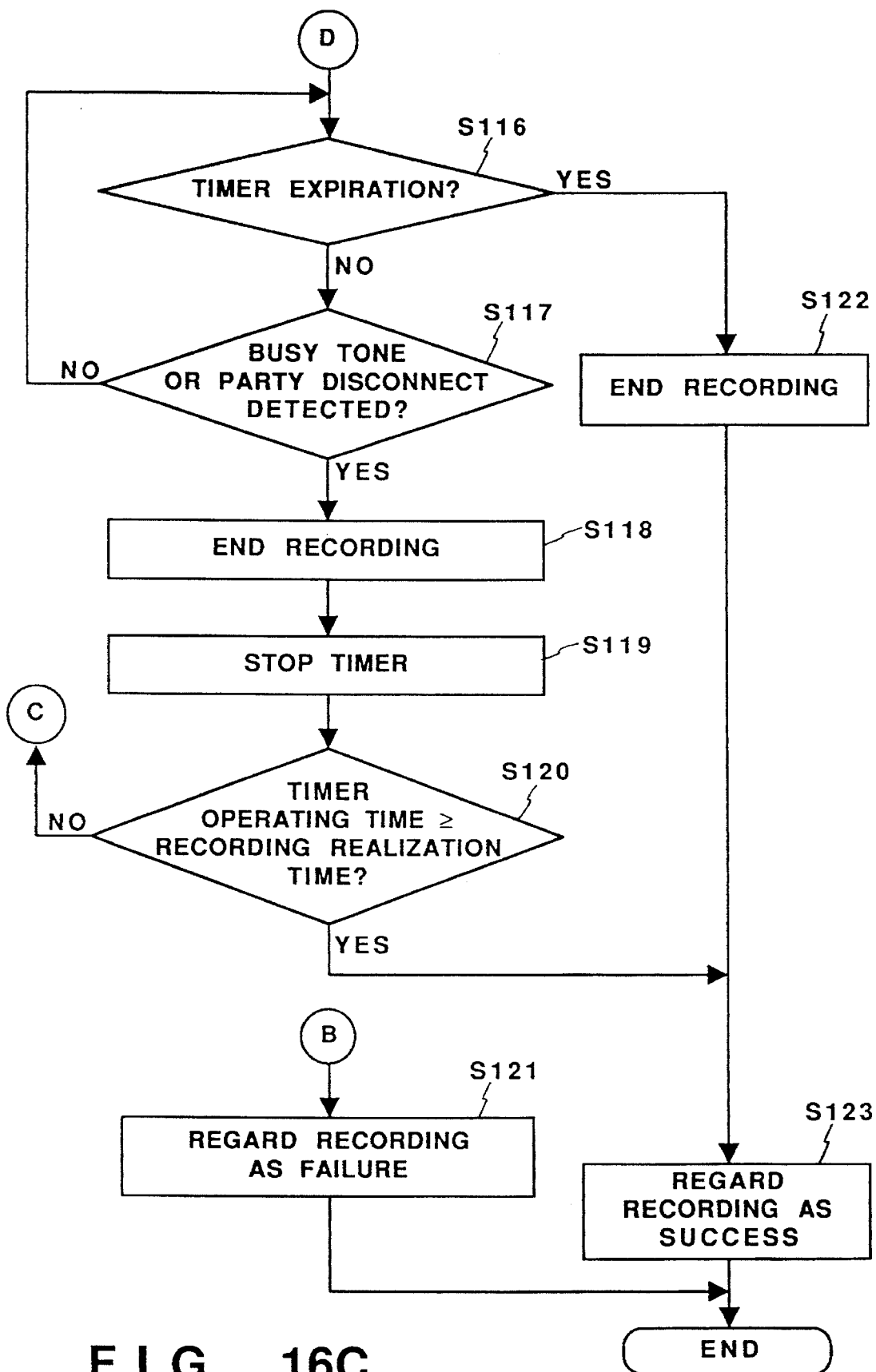

After recording starts at step S114 and the timer 109 for measuring recording time starts at step S115, the CPU of the central controller 104 performs monitoring to determine whether the predetermined recording time has elapsed (step S116 in FIG. 16C). If the time is found to have elapsed at step S116, this is regarded as being an indication to end recording, the recording operation is ended (step S122) and the recording operation is judged to be a success (step S123). Processing is then terminated.

The recorded results are stored, in correlation with the area number, in the main memory 105, as illustrated in FIG. 17. If the trunk circuit 106 detects a busy signal or disconnection of the other party (step S117) before expiration of the time in timer 109, recording is ended (step S118) and the timer 109 is stopped (step S119). The operating time of timer 109 up to this moment is checked at step S120. If this exceeds a predetermined time, recording is deemed to have been realized and the program proceeds to step S123.

If the operating time of timer 109 does not exceed the recording realizing time, this is regarded as indicating recording failure and the processing from step S88 onward is executed.

If recording continues to fail and the result of incrementing the recording-failure counter at step S88 exceeds the allowable number of times for re-transmission ("YES" at step S89), then an abnormality such as a defect in the private branch exchange system or congestion in the network 111 is predicted. Since any further re-transmission would be useless, recording is judged to have failed and the processing operation is ended (step S121).

Thus, the processing is completed depending upon the results of recording, i.e., whether recording has succeeded or failed.

Figure 18:
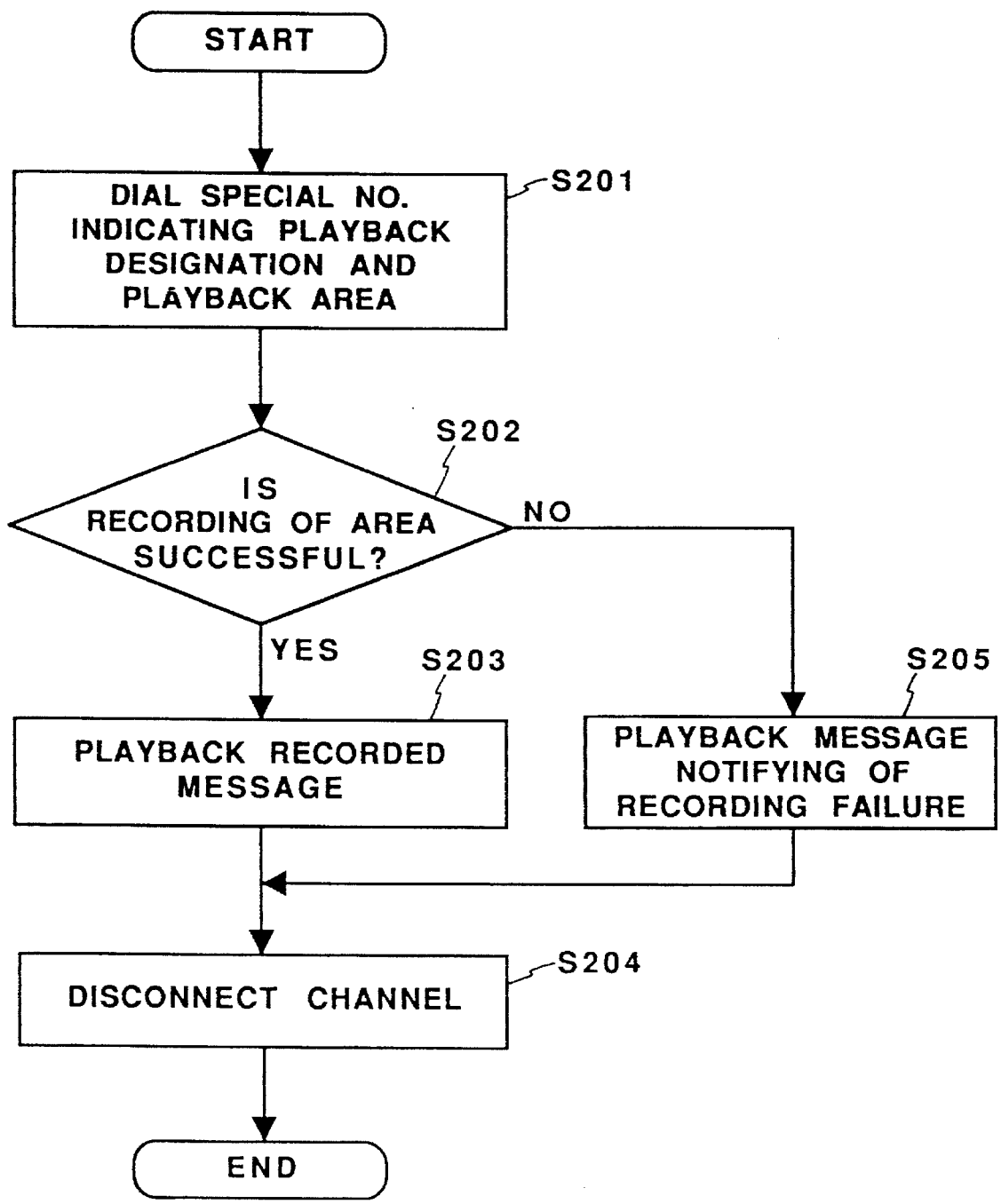
FIG. 18 is a flowchart showing an operation for playing back voice information in the private branch exchange system according to the second embodiment.

The operation preformed by the operator of the extension telephone 108 when recorded audio information is played back will now be described with reference to the flowchart of FIG. 18.

In a case where the operator of the extension telephone 108 plays back recorded audio information, the operator dials a special number (step S201) indicating the playback instruction and the playback area, in a manner similar to that described above in connection with the second embodiment. Upon receiving the special number, the central controller 104 reads the recorded results of the area number indicated by the special number out of the main memory 105 at step S202.

If recording is successful, the recorded audio information is played back (step S203) from the beginning of the recorded area and the information is sent from the audio response device 107 to the extension telephone 108 in the same manner as set forth in connection with the second embodiment. If playback is achieved up to the end of the recording area, the audio response device 107 ends playback and so informs the central controller 104, which proceeds to disconnect the channel to the extension telephone and end the present processing (step S204).

If recording has failed, a message recorded beforehand in the audio response device 107 and informing of recording failure, such as "Recording has failed. Audio information has not been recorded.", is played back and sent to the extension telephone 108 at step S205. After playback and transmission end, the channel is disconnected (step S204) and this processing is ended.

Thus, when a chargeable audio information service is recorded in the audio response device 107, transmission of an outgoing call and recording are performed automatically at a predetermined time so that even audio information the content whereof frequently changes, as is the case with a weather forecast, can be recorded. This makes it possible to eliminate the operator's labor with regard to the sending of outgoing calls and recording of information.

The present invention can be adopted to a multiple-function telephone such as a message telephone.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:

determining means for determining whether a first dial number inputted in order to place a call corresponds to a predetermined service for storing information from a called station;

calling means for placing a call in accordance with the first dial number;

memory means for storing received information from the called station; and enabling means for enabling said memory means to store the received information when said determining means determines that the first dial number corresponds to the predetermined service.

2. The apparatus according to claim 1, wherein said determining means includes second memory means for storing an indication showing that the inputted first dial number corresponds to the predetermined service.

3. The apparatus according to claim 1, wherein said memory means further includes means for storing the first dial number in advance of inputting said first dial number to place a call.

4. The apparatus according to claim 3, wherein said memory means stores information showing the predetermined service corresponds to the first dial number in advance of inputting said first dial number to place a call.

5. The apparatus according to claim 1, wherein the first dial number corresponds to a telephone number information service.

6. The apparatus according to claim 1, further comprising input means including dial keys.

7. A communication apparatus having recording means for recording/playing back information from a line, comprising:

memory means for storing a first dial number in advance corresponding to a predetermined service;

input means for inputting a second dial number;

comparing means for comparing the first dial number with the second dial number inputted; and calling means for placing a call in accordance with the second dial number;

wherein said recording means operates to perform a recording or a playback in accordance with a result of a comparison made by said comparing means, and the recording and the playback correspond to the predetermined service.

8. The apparatus according to claim 5, wherein said recording means avoids placing a call when the inputted second dial number corresponds to the playback service.

9. The apparatus according to claim 7, wherein said recording means plays back information which has been received from a communication party providing the predetermined service when the inputted second dial number corresponds to the playback service.

10. The apparatus according to claim 7, wherein said recording means plays back recorded information when the first and second dial numbers match with each other.

11. The apparatus according to claim 7, wherein said recording means records the information from the line when the first and second dial numbers match each other.

12. The apparatus according to claim 7, wherein said memory means stores operating modes of said recording means corresponding to the first dial number.

13. The apparatus according to claim 7, wherein said input means includes dial keys.

14. The apparatus according to claim 7, wherein the first dial number corresponds to a weather forecast service.

15. A communication apparatus having recording means for recording/playing back information from a line, comprising:

memory means for storing a first dial number in advance corresponding to a predetermined service;

input means for inputting a second dial number;

comparing means for comparing the first dial number with the second dial number inputted; and calling means for placing a call, wherein said recording means operates to perform recording or playback, said recording and playback correspond to the predetermined service, and updates contents of recorded voice information from a called station providing the voice information at a predetermined timing.

16. A communication apparatus comprising:

determining means for determining whether a dial number inputted in order to place a call corresponds to a predetermined service;

executing means for executing the predetermined service in accordance with a determination made by said determining means;

detecting means for detecting the number of times the service is executed at a calling station; and storage means for storing billing information in dependence upon the number of times the service is executed when said determining means determines that the inputted dial number corresponds to the predetermined service.

17. The apparatus according to claim 16, wherein said detecting means detects the number of times the service is executed, by detecting an operation for inputting the inputted dial number.

18. The apparatus according to claim 16, wherein the dial number corresponds to a telephone number information service.

19. A communication apparatus connected to a network, comprising:

receiving means for receiving service information from the network by accessing a service station in the network at a predetermined timing;

a memory for storing the received information;

inputting means for inputting an access number; and read-out means for reading out the received information from said memory when the access number corresponding to that of the service station in the network is inputted.

20. The apparatus according to claim 19, wherein the received information stored in said memory is updated at a predetermined timing.

21. The apparatus according to claim 19, further comprising calling means for automatically calling the network such that said receiving means receives the service information.

22. The apparatus according to claim 21, wherein said calling means is enabled to call the network when the service information changes.

23. The apparatus according to claim 19, wherein in the event no received information is stored in the memory, information showing no-received information is notified.

24. A communication method comprising the steps of:

determining whether a first dial number inputted in order to place a call corresponds to a predetermined service for storing information received from a called station;

placing a call in accordance with the first dial number; and enabling storing of received information when it is determined that the first dial number corresponds to the predetermined service.

25. The method according to claim 24, wherein in the determining step, a stored indication showing that the inputted first dial number corresponds to the predetermined service is used.

26. The method of claim 24 wherein in the determining step, the first dial number which is stored in advance of inputting said first dial number to place a call is used.

27. The method of claim 26 wherein information showing the predetermined service corresponding to the first dial number is stored in advance of inputting the first dial number to place a call.

28. The method according to claim 24 wherein the first dial number corresponds to a telephone number information service.

29. The method of claim 24, further comprising a step of inputting dial numbers by dial keys.

30. A communication method in communication apparatus having recording means for recording/playback of information from a line comprising the steps of:

storing a first dial number corresponding to a predetermined service in advance;

inputting a second dial number;

comparing the first dial number with the second dial number inputted to place a call;

placing a call according to the second dial number;

performing a recording or a playback according to a result of a comparison in the comparing step, wherein the recording and the playback correspond to the predetermined service.

31. The method according to claim 30, wherein the placing of a call is avoided when the inputted second dial number corresponds to the playback service.

32. The method according to claim 30, wherein information received from a communication party providing the predetermined service is played back when the inputted dial number corresponds to the playback service.

33. The method of claim 30 wherein the playback of recording information is performed by the recording means when the first and second dial numbers match each other.

34. The method according to claim 30 wherein the information from the line is recorded by the recording means when the first and second dial numbers match each other.

35. The method of claim 30 wherein operating modes of the recording means corresponding to the first dial number are stored.

36. The method according to claim 30 wherein inputting is performed by dial keys in the inputting step.

37. The method according to claim 30, wherein the first dial number corresponds to a weather forecast service.

38. A communication method in communication apparatus having recording means for recording/playback of information from a line comprising the steps of:

storing a first dial number corresponding to a predetermined service in advance;

inputting a second dial number;

comparing the first dial number with the second dial number inputted to place a call; and placing a call according to the second dial number, wherein recording or playback corresponding to the predetermined service is performed by the recording means and the contents of recorded voice information from a called station providing the voice information are updated at a predetermined timing by the recording means.

39. A communication method comprising the steps of:

determining whether a dial number inputted to place a call corresponds to a predetermined service;

executing the predetermined service in accordance with a determination in the determining step;

detecting the number of times the service is executed at a calling station; and storing billing information in dependence upon the number of times the service is executed when the determination in the determining step determines that the inputted dial number corresponds to the predetermined service.

40. The method of claim 39, wherein in said detecting step, the number of times is detected by detecting an operation for inputting the inputted dial number.

41. The method according to claim 39, wherein the dial number corresponds to a telephone number information service.

42. A communication method for communication apparatus connected to a network comprising the steps of:

receiving service information from the network by accessing a service station in the network at a predetermined timing;

storing the received information;

inputting an access number; and reading out the stored received information when the access number corresponding to that of the service station in the network.

43. The method according to claim 42, wherein the stored received information is updated at a predetermined timing.

44. The method according to claim 42, further comprising the step of automatically calling the network to receive the service information.

45. The method according to claim 44, wherein the automatic calling step includes the step of calling the network when the service information changes.

46. The method according to claim 42, wherein in the event no received information is stored, information showing no-received information is notified.

* * * * *

UNITED STATES PATENT AND TRADEMARK OFFICE
CERTIFICATE OF CORRECTION

PATENT NO. : 5,526,423                    Page 1 of 3

DATED      : June 11, 1996

INVENTORS  : MASATOMO OHUCHI ET AL.

It is certified that error appears in the above-identified patent and that said Letters Patent is hereby corrected as shown below:

COLUMN 1

Line 15,   "of" should read --and--;
  Line 20,   "of" should read --and--.

COLUMN 3

Line 13,   "5" should be deleted.

COLUMN 7

Line 39,   "indicates the time" (2nd occurrence)
             should be deleted.

COLUMN 8

Line 22,   "stores." should read --stores other
             information.--.

COLUMN 9

Line 9,    "playing" should read --plays--.

UNITED STATES PATENT AND TRADEMARK OFFICE
CERTIFICATE OF CORRECTION

PATENT NO. : 5,526,423

DATED : June 11, 1996

INVENTORS : MASATOMO OHUCHI ET AL.

It is certified that error appears in the above-identified patent and that said Letters Patent is hereby corrected as shown below:

COLUMN 14

Line 13,   "preformed" should read --performed--.

COLUMN 15

Line 37,   "claim 5," should read --claim 7,--.

COLUMN 16

Line 55,   "received" should be deleted;
  Line 65,   "claim 24" should read --claim 24,--.

COLUMN 17

Line 1,    "claim 26" should read --claim 26,--;
  Line 5,    "claim 24" should read --claim 24,--;
  Line 31,   "claim 30" should read --claim 30,--;
  Line 34,   "claim 30" should read --claim 30,--;

UNITED STATES PATENT AND TRADEMARK OFFICE
CERTIFICATE OF CORRECTION

PATENT NO. : 5,526,423

DATED : June 11, 1996

INVENTORS : MASATOMO OHUCHI ET AL.

It is certified that error appears in the above-identified patent and that said Letters Patent is hereby corrected as shown below:

<u>COLUMN 17 continued</u>

```
Line 37,   "claim 30" should read --claim 30,--;
Line 40,   "claim 30" should read --claim 30,--.
```

Signed and Sealed this

Fifth Day of November, 1996

Attest:

BRUCE LEHMAN

Attesting Officer    Commissioner of Patents and Trademarks